United States Patent [19]

Talbert et al.

[11] Patent Number: 4,557,253

[45] Date of Patent: Dec. 10, 1985

[54] SOLAR COLLECTOR EMPLOYING CONVENTIONAL SIDING, AND AIR DISTRIBUTION SYSTEM THEREFOR

[75] Inventors: Sherwood G. Talbert; Lawrence J. Flanigan; John M. Corliss, all of Columbus; John G. Hagopian, New Philadelphia; Thomas P. Nunheimer, Strasburg, all of Ohio

[73] Assignee: Atlantic Richfield Company, Los Angeles, Calif.

[21] Appl. No.: 440,869

[22] Filed: Nov. 12, 1982

[51] Int. Cl.⁴ .................................................. F24J 3/02
[52] U.S. Cl. .................................... 126/429; 126/428; 126/432; 126/448; 126/449; 126/DIG. 2
[58] Field of Search .......... 126/429, 431, 450, DIG. 2, 126/428, 432, 448, 449; 52/533, 553

[56] References Cited

U.S. PATENT DOCUMENTS

| | | | |
|---|---|---|---|
| 3,832,992 | 9/1974 | Trombe et al. | 126/429 |
| 4,062,347 | 12/1977 | Jensen | 126/431 X |
| 4,159,801 | 7/1979 | Roland | 126/132 X |
| 4,278,072 | 7/1981 | Ryan et al. | 126/450 |
| 4,314,548 | 2/1982 | Hanson | 126/450 |
| 4,327,708 | 5/1982 | Taylor | 126/429 |

FOREIGN PATENT DOCUMENTS

| | | | |
|---|---|---|---|
| 3014444 | 10/1981 | Fed. Rep. of Germany | 126/429 |
| 56-44551 | 4/1981 | Japan | 126/429 |

*Primary Examiner*—Samuel Scott
*Assistant Examiner*—Allen J. Flanigan
*Attorney, Agent, or Firm*—Knobbe, Martens, Olson & Bear

[57] ABSTRACT

An efficient solar collector that uses a collector panel formed of strips similar to conventional aluminum siding includes air distribution channels along opposite edges of the collector panel. These air distribution channels are formed of enlarged collector panel strips and form headers. Openings are formed through the wall on which the siding is mounted adjacent each of these channels so air from the interior of the building may flow through one or more lower openings into one of the channels, then through the space between the exterior side of the wall and the panel into the other channel, and through the other openings to return to the interior of the building. The air is heated indirectly by the solar radiation impinging on the collector panel as the air flows through the space between the wall and the panel. To increase the efficiency of the collector, a blower can be installed in one of the openings to increase the air flow through the collector.

28 Claims, 8 Drawing Figures

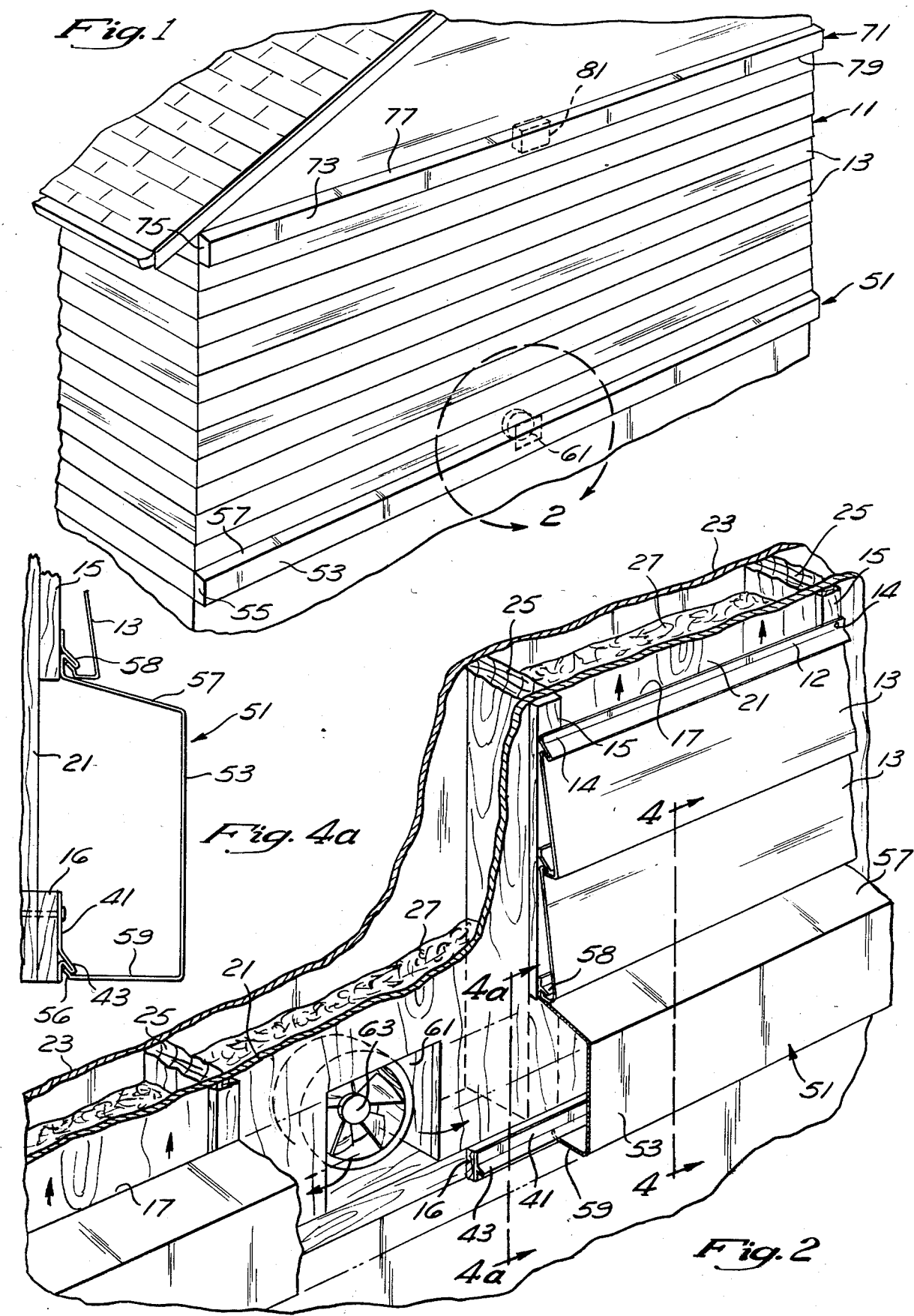

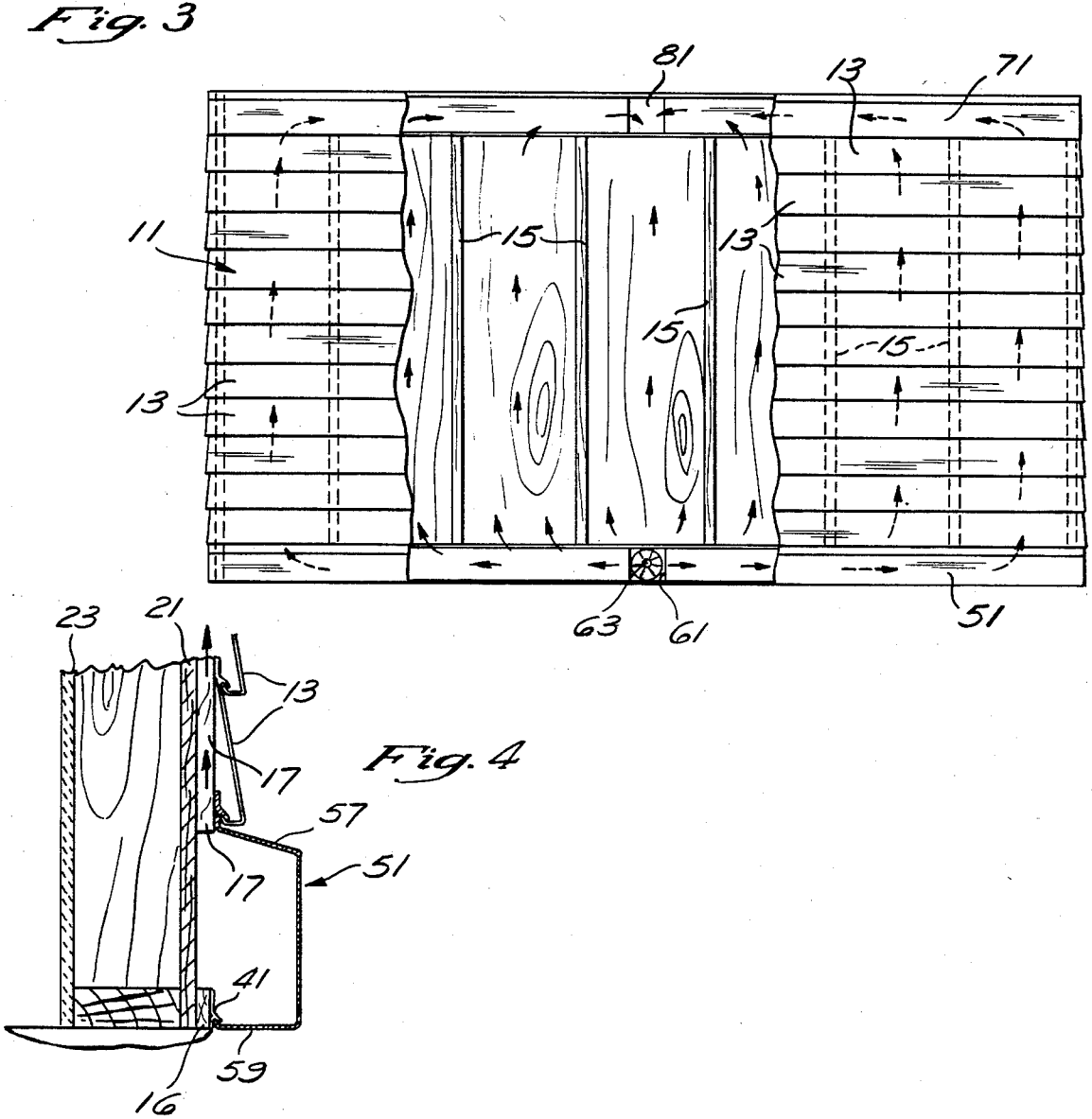

SOLAR COLLECTOR EMPLOYING CONVENTIONAL SIDING, AND AIR DISTRIBUTION SYSTEM THEREFOR

BACKGROUND OF THE INVENTION

As the cost of fuels used to heat buildings has increased in recent years, much interest has developed in using readily available solar energy. Numerous systems have been developed for heating either water or air with the thermal energy provided by solar radiation.

Several of these systems circulate air along a wall of the building that has been fitted with a solar energy collector panel. Among them are the structures disclosed in U.S. Pat. No. 3,832,992 to Trombe et al., U.S. Pat. No. 4,147,300 to Milburn, U.S. Pat. No. 4,069,809 to Strand, U.S. Pat. No. 4,217,883 to O'Hanlon, and U.S. Pat. No. 4,327,708 to Taylor.

Trombe, Milburn, and Strand disclose systems that use a glass or plastic exterior wall that is at least translucent to sunlight, with heavy building material such as masonry or cement used to absorb the solar energy. The air from the interior of the building is heated as it passes over the solar-heated building material and thermal energy is radiated from the building material. The patent to O'Hanlon discloses a system that uses a metal screen instead of the heavy masonry or cement, but still uses a specially constructed wall of a rigid plastic foam and a translucent or transparent sheet of material over the outside surface. Systems such as these are unattractive to many people, particularly individual homeowners, because of the need for special and expensive construction of the wall on which the system is mounted and because a wall with an outer surface made of glass or similar material is aesthetically displeasing. Furthermore, these systems frequently can not be installed on already existing buildings because of the need for special wall construction.

The system described in the patent to Taylor provides a plurality of parallel horizontal air channels, each of which is defined by a metal collector strip attached to the outer surface of an exterior wall. Manifolds at the ends of the channels provide an inlet and an outlet for the air channels. But, because each of the channels has a small cross sectional flow area, the energy losses due to friction are high in this system. These losses necessitate the use of a large air pump to push air through the system and reduce the net energy savings of the system. Additionally, the horizontal orientation of the channels requires that an air pump be used to move the air through the channels.

Even though work has been done in recent years with regard to using the energy provided by the sun to heat buildings, none of the systems so far developed has provided the ordinary homeowner with an inexpensive, relatively easy-to-install, efficient, and aesthetically acceptable means for using this solar energy to aid in heating his dwelling.

In many areas of the country building owners, particularly homeowners, cover the exterior of their buildings with aluminum siding. Aluminum siding has been used for many years to provide an inexpensive, longlasting, and low maintenance exterior surface for buildings. The technology for manufacturing and installing aluminum siding is well known.

Aluminum siding typically comprises eight or ten inch wide strips of aluminum mounted on the exterior of the building. The outer surfaces of the aluminum strips are either painted or coated with other color-giving materials such as polyvinyl chloride. Once installed, the aluminum siding gives the building a like-new appearance.

Frequently, rather than being mounted directly on the surface of the building wall, the aluminum siding strips are mounted on furring strips that have been firmly attached to the wall. When these furring strips are used, a space is formed between the wall of the building and the aluminum siding.

SUMMARY OF THE INVENTION

The system of the present invention is a solar energy collection system for an exterior of a building wherein the wall is covered with a collector panel comprising a plurality of aluminum strips fastened to furring strips to space the panel from the wall surface. Two air distribution channels are attached to opposite edges of the collector panel, of siding, with openings in the wall of the building provided adjacent these channels so that air from the interior of the building may:

1. Flow through one opening into one of the channels;
2. Flow from the one channel to the second channel through the space between the exterior side of the wall and the siding, absorbing thermal energy from the solar radiation impinging on the siding; and
3. Flow from the second channel through the second opening in the wall to return to the interior of the building. A blower may be used in the first or second opening to increase the volume of air flowing through the system.

This solar energy collection system is, unlike those previously developed, inexpensive, easy to install on both existing and newly-constructed buildings, and is aesthetically acceptable to building owners, particularly homeowners.

The solar collection system is adaptable to virtually any type of building: houses, mobile homes, office buildings, factories, and other commercial and industrial buildings. The solar collection system can either be attached to an existing building or built into a structure being constructed.

The system is inexpensive because it uses collector strips that are similar to strips of conventional aluminum siding to form the solar collector panel. The technology for constructing aluminum siding is already well-known.

Installation of the system involves very little more than is involved in installing conventional aluminum siding. No expensive special construction is needed, such as pouring large amounts of concrete, adding expensive masonry to the wall, or mounting glass or plastic on walls. The ease of installation contributes immensely to the inexpensiveness of the present system.

The system is aesthetically pleasing to building owners because it looks from the exterior virtually the same as conventional aluminum siding, which has been used as a covering for the exterior of buildings for many years.

The solar energy collection system of the present invention provides an inexpensive, relatively easy to install, and aesthetically pleasing means for using the energy provided by solar radiation to heat the interior of the building.

BRIEF DESCRIPTION OF THE FIGURES

FIG. 1 is a perspective view of a side of a building with the system of the present invention installed thereon.

FIG. 2 is a cut-away view of the system, showing the lower air distribution channel, the mounting of the collector strips, and the air inlet.

FIG. 3 is a cut-away view of a wall with the system, showing the flow of air through the system.

FIG. 4 is a cross-sectional view of the system and the wall on which it is mounted taken along line 4—4 of FIG. 2.

FIG. 4a is an enlarged cross-sectional view of the lower air distribution channel taken along line 4a—4a of FIG. 2.

DETAILED DESCRIPTION OF THE PREFERRED EMBODIMENT

Figure 5:
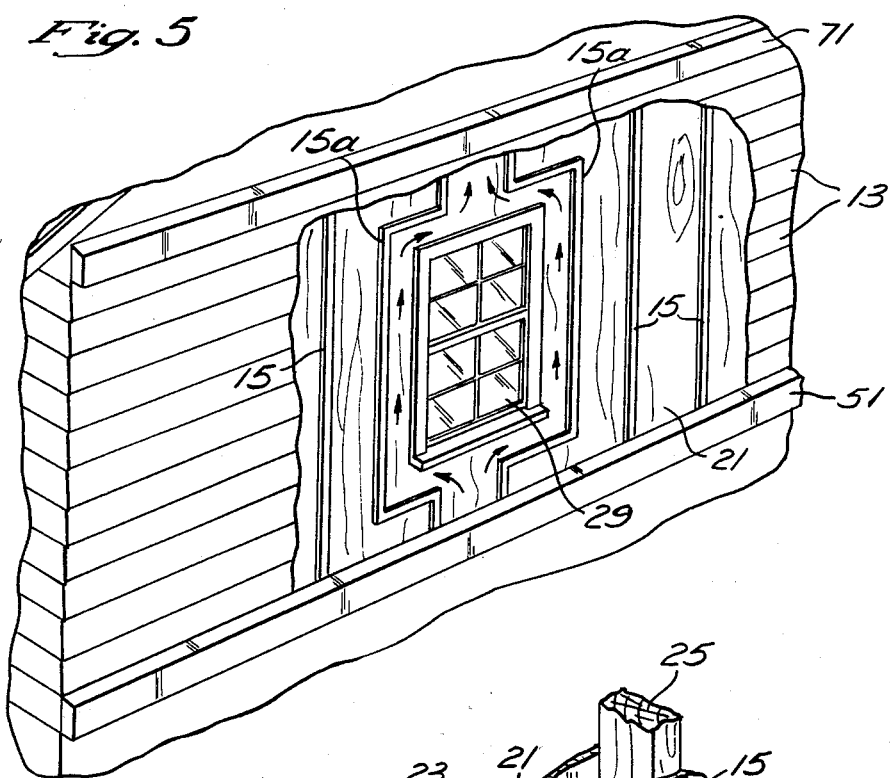
FIG. 5 is a cut-away perspective view of a wall with the system of the invention mounted on it and having a window interrupting it.

The system of the present invention is designed to be installed on a wall of a building that has considerable exposure to the sun. In the northern hemisphere, this is ordinarily the southerly wall of the building. The system is shown as installed in FIG. 1.

The general system and its operation are seen most clearly in FIG. 3. The wall is covered with metallic collector strips 13 mounted on vertical furring strips 15 to form a collector panel 11. The metallic strips 13 are advantageously made of aluminum because of aluminum's good thermal conductivity. The furring strips 15 are firmly attached to the exterior side of the wall. Adjacent the edge of the lowest collector strip 13 is attached lower air distribution channel 51. Inlet opening 61 is formed in the wall and blower 63 is advantageously mounted therein to pull air from the interior of the building into the lower air distribution channel 51. The lower channel 51 communicates along its length with the space 17 (FIG. 4) between the outer wall sheathing 21 and the collector panel 11. This space 17 has a depth equal to the thickness of the furring strips 15 on which the aluminum strips 13 are mounted, typically about one half inch. The space 17 is also open to the upper air distribution channel 71. This upper channel 71 communicates with the interior of the building through outlet opening 81 in the wall.

The Aluminum Collector Panel

Referring to FIG. 2, furring strips 15 are shown attached to the exterior side of a building wall 21. The wall on which the aluminum collector panel 11 is mounted may comprise outer sheathing 21 forming the exterior surface, drywall 23 forming the interior surface, studs 25 between sheathing 21 and drywall 23, and insulating material 27 between the outer sheathing 21 and the interior drywall 23.

Aluminum collector strips 13 are attached to the furring strips 15 by hanging the aluminum strips 13 on mounting nails or screws 14 that are driven through holes in the top lip 12 of the strip 13. So mounting the aluminum strips 13 on the furring strips 15 leaves a space 17 (FIG. 4) between the exterior side of the wall 21 and the aluminum collector panel 11. As is known in the aluminum siding industry, the furring strips 15 are typically approximately sixteen inches apart. The furring strips 15 define air flow channels in the space 17 behind the collector panel 11.

The collector panel 11 may advantageously comprise aluminum siding of substantially conventional design mounted on furring strips in a substantially conventional manner. Such aluminum siding comprises a plurality of aluminum strips hung on mounting nails driven into the furring strips. Each strip has an upper lip that interlocks with the lower edge of the above-adjacent strip of siding. Such siding also typically includes a "starter strip" attached at the bottom of the wall and may include a top strip attached at the top of the wall. The bottom starter strip typically includes a lip that interlocks with the lower edge of the bottom strip of siding. The top strip is generally formed with an edge similar to the bottom edge of a strip of siding, which edge can interlock with the lip on the top-most aluminum siding piece. These pieces finish the top and bottom edges of the siding. The aluminum siding pieces and their interrelationship are well known in the aluminum siding art.

The bottom edge of each aluminum strip 13 is curved under to interlock with the top lip 12 of the adjacent lower strip 13. The interlock between the bottom edge of an aluminum strip 13 and the lip 12 of the lower adjacent strip 13 is substantially identical to the interlock between adjacent strips of conventional aluminum siding.

If the system is installed on a wall having windows, doors, or other interruptions in the wall that interfere with the space 17 between the collector panel 11 and the outer sheathing 21 of the wall (FIG. 5), the furring strips 15 must not extend all the way to the edge of the window, door, or other interruption. Spacing the ends of the furring strips 15 from the edge of the wall interruption allows the air flowing through the space 17 to flow around the interruption and continue on through the system. The ends of the furring strips 15 are advantageously spaced about six inches from the edge of the wall interruption.

Figure 6:
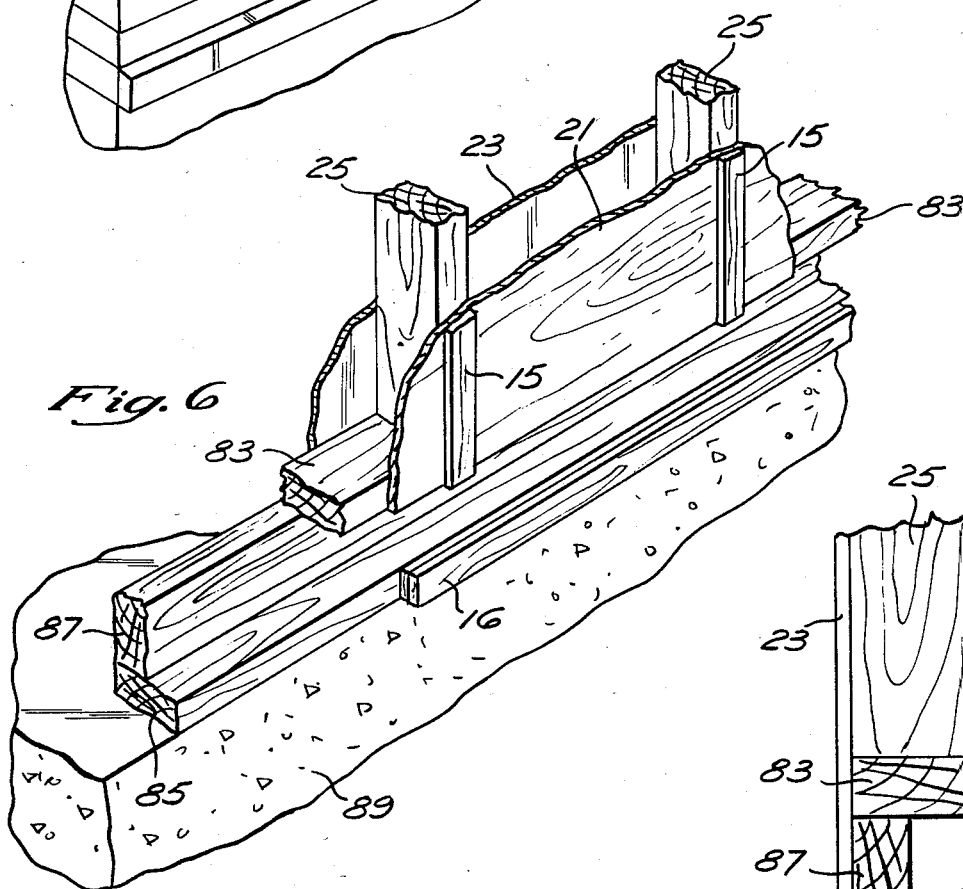
FIG. 6 is an enlarged perspective view of a wall structure suitable for receiving a collector panel to form an alternate embodiment of the invention.

Optionally, the furring strips 15 can be formed around the wall interruption to define a path for the air. For example, shown in FIG. 6 is a wall having the collector panel 11 of the present invention attached to it and having a window 29. The furring strips 15a are shown spaced from the edges of the window 29 and around the window 29 to direct the flow of air around the wall interruption. Directing the air flow in this manner helps to ensure a more even air flow through the space 17 above and below the window 29. With the air flow more evenly distributed behind the collector panel 11, the transfer of heat to the air is more efficient. The collector strips 13 are simply mounted on the modified furring strips 15a in the conventional manner.

The air in the space 17 between the aluminum strips 13 and the exterior sheathing 21 is heated by thermal energy absorbed from solar radiation impinging on the aluminum strips 13. This heat transfer is best if the outer surfaces of the aluminum strips 13 have high solar absorbance, such as if the outer surfaces are of a dark color, such as navy blue or dark brown.

For maximum efficiency in transferring the solar radiation energy absorbed by the aluminum panel 11 to the air flowing through the space 17, the back surface of the collector strips 13 facing the wall 21 should be coated with a substance having a high thermal emissivity, such as flat black lacquer. This high thermal emissivity improves the internal radiative heat exchange between the aluminum panel and the exterior side of the wall 21. Likewise, the surface of the wall 21 should also be coated with a substance of high absorptivity so as much of the internal thermal radiation is absorbed by the walls as possible, and convected back into the air in the space 17.

The Air Distribution Channels

To effectively use the thermal energy convected to the air in the collector space 17, a uniformly distributed flow of air through the collector space 17 must be established. A means for efficiently doing this is upper and lower air distribution channels or plenums 51, 71. These air distribution channels 51, 71 extend along opposite edges of the collector panel 11, and substantially across the width of the collector panel 11. The channels 51, 71 communicate along their lengths with the space 17 behind the collector panel 11 so air can move from the lower air distribution channel 51 into the space 17 more uniformly across the entire width of the collector panel 11. Then the heated air at the top of the space 17 can flow into the upper air distribution channel 71.

Referring to FIGS. 2 and 4a, the area around the lower plenum 51 is shown. The lower plenum 51 comprises a three-sided channel of aluminum or similar material attached to wall-mounted furring strips 15 so its open side faces the exterior sheathing 21 of the wall.

The cross-sectional flow area of channel 51 is large enough to ensure that air flows more readily along the length of channel 51 than up through the space 17. This ensures that the air flow upward through the space 17 behind the collector panel 11 is evenly distributed across the width of the panel. The larger the cross-sectional flow area of the plenum 51 relative to the cross-sectional flow area of the space 17 behind the collector panel 11, the more evenly distributed the air flow behind the collector panel becomes. The area of the plenum should be a relatively large fraction of the area of the space behind the collector panel. The inventors have found that a plenum 51 that has a flow area about one-third the area of the space behind the collector panel provides substantially uniform air flow behind the collector panel. For example, the inventors found that for a system having a twelve foot wide collector panel and one-half inch thick furring strips 15, a channel with a cross sectional area of 24 square inches performs adequately.

The cross sectional area of the channel 51 should also be large enough that the velocity of the air flow through the channel is relatively low to minimize the losses through the channel due to pressure drops caused by high velocity flow. It is best if the air flowing through the system attains its highest velocity through the wall opening 61 and then flows through the channel 51 at a slower speed. Advantageously, the furring strips 15 do not extend into lower channel 51 so that the flow of air along the length of channel 51 is not disturbed by the furring strips.

The system is designed to operate at relatively low pressures. The large inlet plenum 51 allows the air to be uniformly distributed across the width of the panel without the buildup of large pressures that can lead to substantial losses. The large plenum that allows the air to distribute itself without being forced across the width of the panel at high pressure allows the losses associated with high pressure and high velocity systems to be substantially eliminated, greatly iproving the net performance of the system.

The top 57 of the lower channel 51 includes a lip 58 similar to lip 12 on aluminum strips 13. This lip fits under the bottom edge of the adjacent lowest aluminum strip 13 to attach the lower channel to the lower edge of the collector panel. The fit between the top lip 58 of the channel 51 and the bottom of the adjacent aluminum panel 13 is advantageously the same as the fit between the upper lip 12 of an aluminum panel 13 and the bottom edge of an adjacent aluminum panel 13. The top lip 58 of the lower channel 51 also has holes through which mounting screws or nails similar to mounting nails 14 are placed for mounting the lower channel 51 on the furring strips 15.

Advantageously, a narrow aluminum base strip 41 similar to the aluminum starter strip used on many conventional aluminum siding installations is attached to the bottom of the outer wall sheathing 21 or to a horizontal furring strip 16 at the bottom of the wall. The base strip 41 has a lip 43 similar to the lip 12 on the aluminum strips 13. The bottom 59 of the lower channel 51 is formed with an edge similar to the bottom edge of the aluminum strips 13 to interlockingly engage the lip 43 on the base strip 41. This interlocking is similar to the interlocking between the bottom edge of one of the aluminum strips 13 and the lip 12 of the lower adjacent strip 13.

The lower channel 51 may advantageously be fabricated from one or more of the aluminum strips 13 that form the collector panel 11 to ensure a proper interlock between the tip lip 58 of the channel and the bottom edge of the adjacent aluminum strips 13. Forming the lower channel 51 of the aluminum strips also ensures a proper interlock between the bottom of the lower channel 51 and the lip 43 on the base strip 41.

The interlocking arrangement for the top and bottom of the lower channel 51 allows the channel to expand and contract with temperature changes without buckling or distorting. Alternately, the bottom 59 of the lower channel 51 may also be formed with a bottom edge to fit against, and be attached directly to, the exterior surface of the wall 21 or to a horizontal furring strip 16 placed along the lower edge of the wall to prevent air from escaping from the channel to the outside environment.

The ends of the lower channel 51 are closed off with end caps 55 (FIG. 1).

Between the top lip 12 of an aluminum strip 13 and the bottom of an adjacent aluminum strips 13 and also between the top lip 58 of lower channel 51 and the bottom of the adjacent aluminum strip 13 may be inserted weatherstripping or caulking material to prevent the escape of air from the space 17 to the outside environment through cracks between lower lip 56 and wall sheathing 21 or the base strip 41. Weatherstripping can also be installed between the bottom edge of the lower channel 51 and the wall sheathing 21 or the base strip 41. The weatherstripping also minimizes the introduction of cold outside air into the space 17.

Alternately, and advantageously, the top lips 12 of the aluminum strips 13 and the top lip 58 of the lower channel 51 can be formed so the interlocks between them and the bottom edges of the adjacent aluminum strips 13 are air tight. Such an airtight fit eliminates the need for weatherstripping or caulking material. Also, the interlock between the bottom edge of the lower channel 51 and the base strip 41 can be made airtight to eliminate the need for weatherstripping or caulking material there.

As shown in FIG. 1, the upper air distribution channel 71 is mounted adjacent the top aluminum strip 13. This channel is very similar in design to the lower channel 51, with three sides 73, 77, and 79. Upper channel 71 also includes end caps 75.

The top 77 of the upper channel 71 preferably has a lip like the top lip 58 on the lower channel 51. An aluminum top strip may be attached to the wall adjacent the top edge of the upper plenum 71. This top strip is similar to the base strip 41, except that the lip on the top strip resembles the bottom edge of the aluminum strips 13. With this type of lip, the top strip can be interlocked with the lip on the top of the upper channel 71. In this way the upper channel is attached to the wall and the air in the channel is prevented from escaping to the atmosphere. The bottom of the upper channel 71 is best formed like the bottom of the aluminum strips 13 to interlock with the upper lip of the upper-most adjacent collector strip 13. As with the lower channel 51, if the upper channel is formed from one or more aluminum strips like the strips 13, proper interlocking is assured.

The cross sectional flow area of the upper channel 71 is also sufficiently large that the air flowing through the system flows easily along the channel at a relatively low velocity so the losses due to pressure drops in the channel are minimized. An upper opening 81, similar to the lower opening 61, is formed in the wall to permit air in the upper channel 81 to re-enter the building interior.

For Systems Installed In New Construction

If the system is to be installed during construction of a new building, the plenums can be located inside the wall rather than outside, to give the exterior wall an entirely conventional appearance.

Referring to FIG. 6, to form the plenums inside the wall, the wall is constructed with double top and bottom plates in the wall framing. The space between the two top plates forms the upper air distribution channel, and the space between the two bottom plates 83, 85 forms the lower air distribution channel. The vertical wall studs 25 are placed between the upper and lower air distribution channels.

Narrow spacers or 2" by 4" studs 87 can be placed on edge in the channels to hold the plates 83, 85 defining the plenum apart. These boards must be strong enough to withstand the stresses of supporting the structure, yet small enough that they do not substantially interfere with the air flow through each of the plenums.

Figure 7:
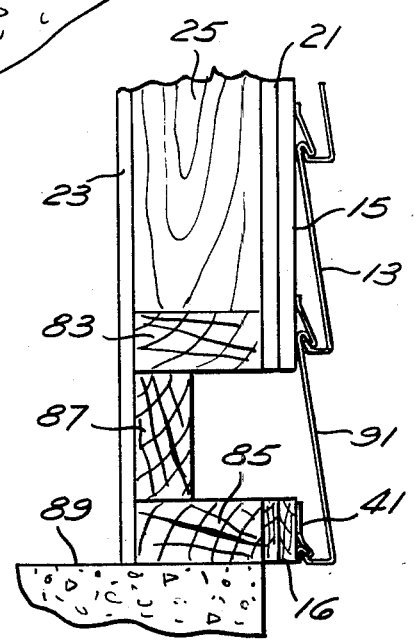
FIG. 7 is a cross-sectional view of the wall shown in FIG. 6 with the collector panel attached.

Referring now to FIG. 7, each of the plenums is open along its length to the space between the aluminum collector plate and the outer wall sheathing 21. The collector plate is again formed of strips 13 attached to furring strips 15 on the outside of the wall in the same manner as the collector panel 11 of embodiment described above to space the collector panel from the outer sheathing 21 of the wall.

In this embodiment, rather than an aluminum air distribution channel such as lower air distribution channel 51 appearing on the outside of the wall (see FIGS. 1 and 2), all that is visible on the outside of the building is a lower aluminum strip 91, which looks no different from an ordinary aluminum panel strip. Thus, a person seeing the bulding simply sees what appears to be conventional aluminum siding on the wall. The bottom edge of the lower aluminum strip 91 interlocks with the lip on the base strip 41, which is attached to the horizontal bottom furring strip 16.

The Wall Openings

An inlet or lower opening 61 and blower 63 are provided in the wall so that air may be drawn from the interior of the building into the lower channel 51. For a typical 8 feet by 12 feet collector area the blower 63 may be a conventional high capacity fan, such as the Howard Model 3-15-5800 6-inch round fan, or the Howard Model 3-15-5601 6-inch stackable fan. These fans are capable of blowing approximately 200 cubic feet of air per minute through opening 61 at about 500 feet per minute when operating off standard 60 Hertz, 115 volt AC power. These conditions produce a flow rate in the air space 17 of about 2 cubic feet per minute per square foot.

The blower 63 can be located in the upper outlet opening 81, rather than the lower, inlet opening 61, to draw air through the system.

For systems having a collector area larger than the standard 8 feet by 12 feet, increased air flow through the system is advantageous to obtain maximum effectiveness from the larger collector area. The increased air flow can be obtained by enlarging the inlet opening 61 and the air distribution channel, and placing more than one blower 63 in the enlarged opening. The size of the outlet opening 81 should then be increased or more than one outlet opening should be supplied to provide communication between the upper plenum 71 and the interior of the building. Increased air flow can also be obtained by supplying more than one inlet opening 61 communicating between the interior of the building and the lower air distribution channel 51. A blower 63 can be placed in each of the inlet openings 61.

The blower 63 may be controlled by either a manual on/off switch, or by an automatic switch that is responsive to the temperature of the air in space 17 near the top of the wall. The thermostat control should activate blower 63 when the temperature of the air in space 17 is higher than the desired temperature for the interior of the building. The blower 63 should be deactivated when the air in the collector space 17 is cooler than the air inside the building.

A proportional controller may also be advantageously used with the blower 63. Such a proportional controller would cause blower 63 to operate at a low speed when the air in space 17 is marginally above a threshold temperature, and as in the cooler morning or late afternoon hours when the solar radiation impinging the collector panel 11 is not sufficient to adequately heat air flowing through the space 17 at the maximum rate.

Alternately, the blower 63 may be powered by photovoltaic cells to make the system entirely solar powered for daytime heating. The power output of the photovoltaic cells is proportional to the amount of sunlight the photovoltaic cells receive. Thus, the speed of the blower 63 is also proportional to the amount of sunlight falling on the photovoltaic cells. In the morning and late afternoon hours, when less sunlight falls on the collector panel 11, to heat the air in the space 17 behind the collector panel, less sunlight falls on the photovoltaic cells, and the blower 63 operates at a lower speed.

At night and certain other times the air inside the space 17 behind the collector panel 11 may be cooler than the air inside the building because no solar radiation is falling on the collector panel 11 to heat the air. Since cooler air is heavier than warmer air, the cooler air in the collector space 17 tends to flow toward the lower wall opening 61 and into the building, while the warmer building air tends to flow through the upper wall opening 81 into the solar collector system, where it loses some of its heat to the colder surrounding environment.

To prevent air from flowing backward through the system at night and cooling the interior of the building, a back draft damper assembly (not shown) is installed either in the upper opening 81 or the lower opening 61. This damper assembly may comprise a lightweight pivoting plate mounted on an axle extending across the opening. A damper installed in the upper opening 81 would pivot to permit air to flow through the opening 81 from the upper channel 71 to the interior of the building but prevents the flow of air in the reverse direction. If the damper is installed in the lower opening 61, it whould pivot to permit air from the interior of the building to enter the lower channel 51, but prevent air from blowing from the lower channel 51 into the interior of the building.

Wall registers (not shown) may be placed over the openings 61 and 81 on the interior wall 23 (FIG. 2) to give the openings the appearance of ordinary central warmair heating outlets.

In some installations, the noise generated by the blower 63 may be excessive. If noise is likely to be a problem, the opening through the interior drywall 23 may be offset from the blower 63 and the opening 61 through the outer sheathing 21. This avoids a direct path for transmission of noise from the blower 63 into the interior of the building. Additionally, acoustic material may be added inside the wall cavity in which the blower 63 is located to further reduce noise transmission to the interior of the building.

Rather than channelling the heated air directly into the interior of the building, the outlet opening 81 can channel the heated air to a heat storage system for use on cool, cloudy days or at night. The heat storage system must be compatible with a hot air system, rather than a hot water system. One such heat storage system is an insulated bed of rocks buried, for example, under the building. Obviously, different blowers would be required to handle the higher pressure drops through such a heat storage system.

The heated air from the outlet 81 of the solar collector system is directed over or through the bed of rocks. The rocks absorb heat from the air for use at a later time. When the heat stored in the rocks is wanted, air from inside the building is again passed over or through the bed. The air absorbs heat from the rocks and is directed back into the building as warm air to heat the interior of the building.

Operation of the System

When the temperature of the air in the collector space 17 is high enough, and the occupant of the building on which the system is mounted deisres to have the air in the interior of the building heated, he switches on the blower 63 or the thermostat control automatically activates the blower 63. The blower 63 draws air from the interior of the building through the lower wall opening 61 into the lower channel 51.

In the channel 51 the air flows along the length of the channel and then up through the space 17 between the aluminum strips 13 and the exterior surface of the wall 21. The air, upon passing through opening 61, does not all flow immediately up through the space 17 above the opening 61, but rather flows along the length of the channel 51 before flowing upwards because the cross-sectional area of the channel 51 is much greater than the area of the space 17 above the blower. Thus, the air will flow more readily along the channel 51 than through the space 17 immediately above the blower opening 61.

A relatively uniform air pressure will then be built up along the length of the channel 51, thereby allowing the flow of air through the space 17 to be evenly distributed across the width of the wall. In this way, maximum effectiveness is obtained from the system. Also, because of the relatively large size of lower channel 51, the location of opening 61 along the bottom of the wall does not materially affect the uniformity of the flow of air through the space 17.

As the air flows upwardly through the space 17, it absorbs thermal energy from the solar radiation that impinges on the siding strips 13. For maximum absorption, the exterior or the aluminum strips 13 should be a dark color, such as navy blue or dark brown.

The solar energy impinges the exterior surface of the aluminum strips 13. If the surface is coated with a substance of high solar absorbance, such as a dark color paint, a large percentage (80 to 95 percent) of the solar energy is absorbed by the siding 13.

The solar energy absorbed is convected from the back of the strips 13 as thermal energy to the air in the space 17, and also radiated to the opposite exterior wall surface. The efficiency of this radiant transfer of energy from the strips 13 to the opposite surface in space 17 depends on the thermal emissivity of the back; the higher the thermal emissivity, the better the overall heat transfer to the air in the collector space 17.

Some of this energy may be lost, however, because the thermal emissivity of the outer surface of the aluminum strips 13 causes some of the thermal energy to be radiated to the outside environment. Wind blowing by the outer surface of the siding may cause additional losses. But, on most sunny days this loss is minimal.

The vertical furring strips 15 channel the upwardly moving air to help ensure a relatively even distribution of air across the width of the collector to maximize the effectiveness of the system. The vertical air flow allows the movement of air to be aided by the natural reduction of the air's density as it is heated, and the consequential tendency of the heated air to rise.

After the air has been heated, it enters the upper channel 71 and, because of the large cross-sectional area of the channel 71, flows along the length of the channel to the outlet opening 81, through which it returns to the interior of the building as heated air. As the air flows through opening 81 it pushes the back draft damper open.

The air flow and pressure is distributed and equalized across the width of the collector space 17 by the natural air flow through the upper and lower plenums or air distribution channels 51, 71. The plenums 51, 71, with their large cross-sectional areas, distribute the air across the width of the panel with a minimum of pressure losses, reducing the pressure losses through the system. Consequently, the blower 63 does not need to build up a high pressure at the inlet to the system. The pressure level require by the blower 63 may therefore be reduced, which will reduce the initial cost of the blower and reduce its energy consumption. Since the pressure at the system inlet has been reduced because of the lower pressure losses through the system, leaks at the joints between system elements are less likley to occur than in systems having higher pressure losses and higher pressures.

As discussed above, additional utility can be obtained by use of a proportional controller or photovoltaic cells with the blower 63. In the coller morning and later afternoon hours an insufficient amount of solar radiation impinges the collector area 11 to adequately heat the air in the space 17 if the blower 63 is moving the air through the space 17 at full volume. However, the radiation may be sufficient to heat the air if it flows at a lower volume. Thus, a proportional controller may be used to run blower 63 at slower speeds when the air in space 17 is at a temperature high enough that the air can be used to heat the building interior, but too low to permit blower 63 to be operated at full speed.

When operation of the system is no longer desired, as at night or on extremely cloudy days when virtually no solar radiation energy is available, the blower 63 is turned off either manually or by the thermostat control. The damper in the upper outlet opening 81 closes to prevent the backward flow of air through the space 17 since no air is flowing from upper channel 71 through opening 81. In this way, the thermal energy of the heated air inside the building is not lost to the outside environment.

Tests of the preferred embodiment described above have shown that the heat energy gained through use of the system is up to one hundred times the energy needed to operate the blower 63 that circulates the air through the system. With 200 ft.$^3$/min. of air circulating through an 8 foot by 12 foot collector panel, the 57° F. inlet room air was heated to an outlet temperature of 103° F. for a useful heat output of 10,400 Btu per hour. The efficiency of the panel as a solar collector was 40 percent at these conditions. The outdoor ambient temperature was 64° F., the windspeed was 6.7 miles per hour, and the solar radiation on the wall surface was 256 Btu/hr.-ft$^2$.

Operation of the Systems as an Air Cooler

With slight modifications, the system described above can be used at night during months of warmer weather to cool the interior of the building.

To transform the system into a cooling system, the dampers in the upper or lower wall openings 61, 81 are reversed. The reversed dampers permit warm air from inside the building, near the top of the building, to flow through the upper opening 81 (which in this mode becomes an inlet) into the upper air distribution channel 71. If the temperature of the air on the outside of the aluminum collector panel is lower than the temperature of the air entering the upper channel and sunlight is not falling on the collector panel 11, the air entering the upper channel 71 and flowing behind the collector panel 11 will transfer its heat to the outside environment. As the air behind the collector panel loses its thermal energy, it becomes denser and flows downward through the collector space 17, losing more thermal energy through the collector panel 11 as it goes. The damper in the lower wall opening 61 (if any) permits this cooled air to reenter the building.

During the warmer days the reversed damper in the lower opening 61 (if any) prevents air from the interior of the building from flowing through the lower opening 61 into the lower air distribution channel 51 where it can enter the collector space 17 and be heated by the solar radiation impacting the collector panel 11. The reversed damper in the upper opening 81 prevents air that has been heated behind the collector panel 11 from flowing upwardly and through the upper wall opening 81 into the interior of the building.

The blower 63 in the lower wall opening 61 can either be reversed or moved to the other wall opening 81 to help circulate air through the system and improve the cooling efficiency.

Alternatively, the conventional collector panel can be used to cool at night simply by operating the blower(s) manually. Cooling can be accomplished whenever the siding is cooler than the room air temperature.

Alternate Installation for Free Convection Air Flow

A passive solar collector system, lacking a blower to increase the rate of air flow, can also be constructed using essentially the system disclosed above. The principle on which such a free convection system operates is that the layer of heated air next to the solar absorber will tend to rise because of its lower density.

The convection flow system uses the same aluminum panel strips mounted on furring strips as the active system described above does. But the upper and lower air distribution channels, instead of being channels formed of the metallic material on the outside of the wall, are elongate openings through the wall, one near the lower edge of the collector panel and another adjacent the upper edge of the collector panel. Each of these openings or channels extends substantially across the width of the panel. The wall inlet and outlet that provide communication between the interior of the building and the channels each have substantially the same dimensions as the channel openings. Thus, air from the interior of the building flows readily through the inlet into the first channel, and then from the channel into the flow area behind the collector panel. Because the air channel extends substantially across the width of the panel, and the inlet is substantially the width of the channel, the air is distributed substantially uniformly across the width of the space behind the collector panel. To obtain optimum flow and heat transfer, the area of the air channel opening in the wall should be equal to or greater than the cross-sectional flow area of the space behind the collector panel. It has been found that for optimum performance of the convective system the furring strips should be at least one inch thick to provide a space of at least one inch between the outside of the wall and the aluminum collector panel.

A flexible flapper made of a thin (0.001 inch) sheet of plastic or similar material is advantageously placed inside the lower opening to prevent cold air from entering the building from the collector space at night or at other times when the air behind the solar siding is cooler than the air in the building, while still permitting air to enter the solar collector when the air in the collector is being heated.

Optionally, a similar flexible flapper can be placed inside the upper opening in summer months to prevent hot air from behind the solar collector panel from entering the interior of the building during hot days. If the flapper in the lower opening is also removed during the summer, the system will cool the interior of the building at night. In this mode the warm air inside the building is allowed to flow through the upper opening into the space behind the collector panel. There the air will cool, flowing down as it cools, and reenter the building through the bottom opening.

Optional Glazing

The upper and lower air distribution channels 51, 71 can also serve as support members for permanent or temporary glazing. Mounting tracks can be placed on the upper surface 57 of the lower channel 51 (FIG. 1) and on the lower surface 79 of the upper channel 71 to hold the bottom and top edges of a sheet of hard translucent or transparent glazing such as glass or plastic.

This glazing, spaced a small amount from the exterior surface of the aluminum panel 11 improves the thermal performance of the system by giving a greenhouse effect to the air immediately adjacent to the collector panel and shielding the panel from the wind. The glazing permits the solar radiation to impinge on the aluminum collector panel 11 so it can radiate and convect thermal energy to the air in the collector space 17 (FIG. 4). But the thermal energy lost by the exterior surfaces of the aluminum strips 13 that would normally be lost directly to the environment is better trapped in the space between the glazing and the aluminum panel because the glazing shields the panel from ambient conditions. The glazing is particularly helpful in windy environments, since the glazing keeps the cold ambient air from directly contacting the exterior surfaces of the aluminum strips 13.

If the glazing is removable it can be installed during winter months to enhance the performance of the system during the colder heating season, and removed during the warmer seasons to restore the wall to a more conventional appearance.

We claim:

1. A system for changing the temperature of air, comprising:

a panel attached to the exterior side of a wall of a building and spaced from said wall to provide an air flow space between said panel and said wall, wherein said panel covers a relatively large portion of said wall, said panel comprising a plurality of substantially horizontal strips of conventional metallic exterior siding, wherein each strip comprises a substantially horizontal bottom portion extending along the length of the strip, said bottom portion having an inner edge and an outer edge, said inner edge being turned upwardly, a substantially planar portion extending upwardly from the outer edge of said bottom portion at an angle of less than 90 degrees with respect to said bottom portion, said planar portion having a substantially flat exterior surface and a substantially flat interior surface, and an upper portion extending upwardly from said planar portion, said upper portion having a downwardly extending lip whereby said lower edge of each strip interlocks with the lip on the upper portion of the next lower adjacent metallic strip;

a first air distribution channel adjacent the lower edge of said panel, extending substantially across the width of said panel, communicating along its length with said space, and adapted to distribute air substantially uniformly across the width of space behind said panel;

an inlet into said first air distribution channel, said inlet communicating with the interior of said building;

a second air distribution channel adjacent the upper edge of said panel, extending substantially across the width of said panel, communicating along its length with said air flow space; and an outlet from said second channel, said outlet communicating with the interior of said building.

2. The system defined in claim 1, wherein:

said strips of conventional metallic siding are mounted on furring strips attached to said wall to space said panel from said wall.

3. The system defined in claim 2, wherein said furring strips are oriented perpendicular to said air distribution channel.

4. The system defined in claim 3, wherein:

said first and second air distribution channels comprise first and second elongate air openings through said wall, wherein each of said air openings extends substantially across the width of said panel;

said inlet into said first air opening has substantially the same dimensions as said first air opening through said wall; and said outlet from said second air opening has substantially the same dimensions as said second air opening through said wall.

5. The system defined in claim 2:

wherein said wall has an interruption;

wherein said furring strips do not intersect the edges of said interruptions; and additionally comprising furring strips attached to said wall and defining an air flow path in said space around said wall interruption.

6. The system defined in claim 1, additionally comprising:

a damper in said outlet to prevent reverse flow of air from the interior of said building through said outlet into said space; and a blower to assist the flow of air through said inlet into said air distribution channel.

7. The system defined in claim 1, for raising the temperature of air, wherein:

said panel comprises a solar collector panel and is positioned to be impinged by solar radiation;

said first air distribution channel is adjacent the lower edge of said panel; and said second air distribution channel is adjacent the upper edge of said panel.

8. The system defined in claim 1, for lowering the temperature of air, wherein:

said panel is a radiative heat exchanger with the environment and sky surrounding said building;

said first air distribution channel is adjacent the upper edge of said panel; and said second air distribution channel is adjacent the lower edge of said panel.

9. The system defined in claim 1, wherein the exterior surface of said panel is coated with a substance having high solar absorptivity.

10. The system defined in claim 9, wherein:

the surface of said panel facing said wall has high thermal emissivity; and the exterior surface of said wall has high thermal absorptivity.

11. The system defined in claim 2, wherein said exterior siding strips are formed from aluminum.

12. A system for changing the temperature of the air in a building, the system comprising:

a metallic panel covering an exterior wall of said building, wherein:

said panel comprises a plurality of strips wherein each strip comprises a substantially horizontal bottom portion having an upwardly turned lower edge, a substantially planar portion extending upwardly from the bottom portion and sloped away from the vertical over the bottom portion, said planar portion having a substantially flat exterior surface and a substantially flat rear surface, and a lip adjacent the upper edge of said strip, whereby said lower edge of each strip is adapted to interlock with the lip of the next lower adjacent metallic strip;

said panel is fastened to furring strips to create an air flow space between the exterior side of said wall and said panel, and said furring strips define vertical flow channels through said air flow space;

first and second air distribution channels mounted along opposite edges of said panel, said first and second channels communicating with each other through said air flow space between said wall and said sliding, said channels having a cross-sectional flow area greater than the cross-sectional flow area of one of said flow channels, and adapted to distribute a flow of air across the width of said space, wherein each of said air distribution channels comprises a metallic sheet shaped to form the sides of said air distribution channel, and wherein said wall forms a side of said air distribution channel;

an inlet into said first air distribution channel, said inlet communicating with the interior of said building; and an outlet from said second air distribution channel, said outlet communicating with the interior of said building.

13. The system defined in claim 12, additionally comprising:
a blower to assist the flow of air through said inlet into said first air distribution channel; and
a damper to prevent the reverse flow of air from the interior of said building through said outlet into said second air distribution channel.

14. The system defined in claim 12, for raising the temperature of air inside said building, wherein:
said panel comprises a solar collector panel and is positioned to be impinged by solar radiation;
said first air distribution channel is located relatively near the bottom of said wall; and
said second air distribution channel is located relatively near the top of said wall.

15. The system defined in claim 12, for lowering the temperature of air inside said building, wherein:
said panel comprises a radiative heat exchanger with the environment surrounding said building;
said first air distribution channel is located relatively near the top of said wall; and
said second air distribution channel is located relatively near the bottom of said wall.

16. The system defined in claim 12 wherein the exterior surface of said panel is coated with a substance having a high solar absorptivity.

17. The system defined in claim 16 wherein:
the surface of said panel facing said wall has high thermal emissivity; and
the exterior surface of said wall has high thermal absorptivity.

18. The system defined in claim 12, wherein said exterior siding strips are formed from aluminum.

19. The system for changing the temperature of air defined in claim 17, wherein each of said plenums comprises a channel mounted on the outer surface of said wall adjacent an edge of said panel.

20. The system for changing the temperature of air defined in claim 19, wherein said channels are formed of metallic material.

21. The system defined in claim 12, wherein two adjacent sides of said channel are not joined to one another, to form an opening along the length of the channel, said opening communicating with said space between said wall and said panel.

22. A system for changing the temperature of air, comprising:
a plurality of substantially vertically oriented furring strips attached to the outer surface of a wall of a building;
a plurality of substantially horizontally oriented strips of conventional metallic exterior siding attached to said furring strips to form a panel having a top edge and a bottom edge, said panel spaced from said wall to define an air flow space between said wall and said panel, wherein each strip of conventional metallic exterior siding comprises a substantially horizontal bottom portion having an upwardly turned lower edge, a substantially planar portion extending upwardly from said bottom portion and sloped inwardly towards the furring strips, said planar portion having a substantially flat exterior surface and a substantially flat rear surface, and a lip adjacent the upper edge of said strip, whereby said lower edge of each strip is adapted to interlock with the lip of the next lower adjacent metallic strip;
first and second plenums adjacent said top and bottom edges of said panel, wherein each of said first and second plenums communicates along its length with said air flow space between said panel and said walls so that air can pass between said first and second plenums through said air flow space, and said furring strips can channel said air vertically as said air passes through said air flow space;
a first opening between said first plenum and the interior of said building; and
a second opening between said second plenum and the interior of said building.

23. A system for changing the temperature of air, comprising:
a plurality of substantially vertically-oriented furring strips attached to the outer surface of a wall of a building;
a plurality of substantially horizontally-oriented metallic strips attached to said furring strips to form a panel having a top edge and a bottom edge, said panel spaced from said wall to define a space between said wall and said panel, wherein the bottom edge of each of said metallic strips interlocks with the top edge of the next lower adjacent metallic strip, and wherein each of said metallic strips has a substantially flat exterior surface and a substantially flat rear surface;
first and second plenums adjacent said top and bottom edges of said panel, wherein:
the framing of said wall is constructed with a pair of bottom plates to define said first plenum;
the framing of said wall is constructed with a pair of spaced top plates to define said second plenum; and
each of said first and second plenums communicates along its length with said space between said panel and said wall so that air can pass between said first and second plenums through said space, and said furring strips channel said air as said air passes through said space;

a first opening between said first plenum and the interior of said building; and a second opening between said second plenum and the interior of said building.

24. The system for changing the temperature of air defined in claim 23, additionally comprising:

a spacer between said pair of bottom plates to maintain the spacing of said bottom plates; and a spacer between said pair of top plates to maintain the spacing of said top plates.

25. The system for changing the temperature of air defined in claim 24, wherein:

said spacers each comprises a substantially horizontal stud extending edgewise between said plates.

26. A system for changing the temperature of the air in a building, the system comprising:

a plurality of vertical furring strips attached to the exterior wall of said building;

a plurality of horizontal strips of conventional exterior aluminum siding attached to said furring strips to form an aluminum siding panel, said panel spaced from said wall by said furring strips to form an air flow space between said wall and said panel, wherein each of the strips of said aluminum siding includes a substantially horizontal bottom portion having an upwardly turned lower edge, a substantially planar portion extending upwardly from said bottom portion and sloped inwardly toward the furring strips, said planar portion having a substantially flat exterior surface and a substantially flat rear surface, and a lip adjacent the upper edge of said strip, whereby said lower edge of each strip is adapted to interlock with the lip of the next lower adjacent metallic strip;

a first air distribution channel adjacent the lower edge of said panel and communicating with said air flow space between said wall and said aluminum siding panel, said first channel comprising a strip of aluminum wider than said siding strips and shaped to form said channels, said channel strip including a lip adjacent its upper edge adapted to interlock with the lower edge of the lowest strip of aluminum siding;

a second air distribution channel adjacent the upper edge of said aluminum siding panel and communicating with said air flow space between said wall and said aluminum siding panel, said second channel comprising a strip of aluminum similar to said siding strips and shaped to form said second channel, said second channel strip including a lower edge adapted to interlock with the lip of the upper strip of aluminum siding;

an inlet into said first air distribution channel, said inlet communicating with the interior of said building; and an outlet from said second air distribution channel, said outlet communicating with the interior of said building.

27. The system defined in claim 26, additionally comprising:

a base strip attached to said wall, said base strip having a lip adapted to interlock with the lower edge of the first air distribution channel strip; and a top strip having a lower edge, wherein the second air distribution channel strip has a lip adjacent its upper edge adjacent to interlock with the lower edge of the top strip.

28. The system defined in claim 26, wherein:

the lower edge of said first air distribution channel strip is attached to said wall; and the upper edge of said second air distribution channel is attached to said wall.

* * * * *